Nov. 3, 1942.  C. R. ATHY  2,300,763
PORTABLE WELL DERRICK
Filed Oct. 28, 1941  3 Sheets-Sheet 2

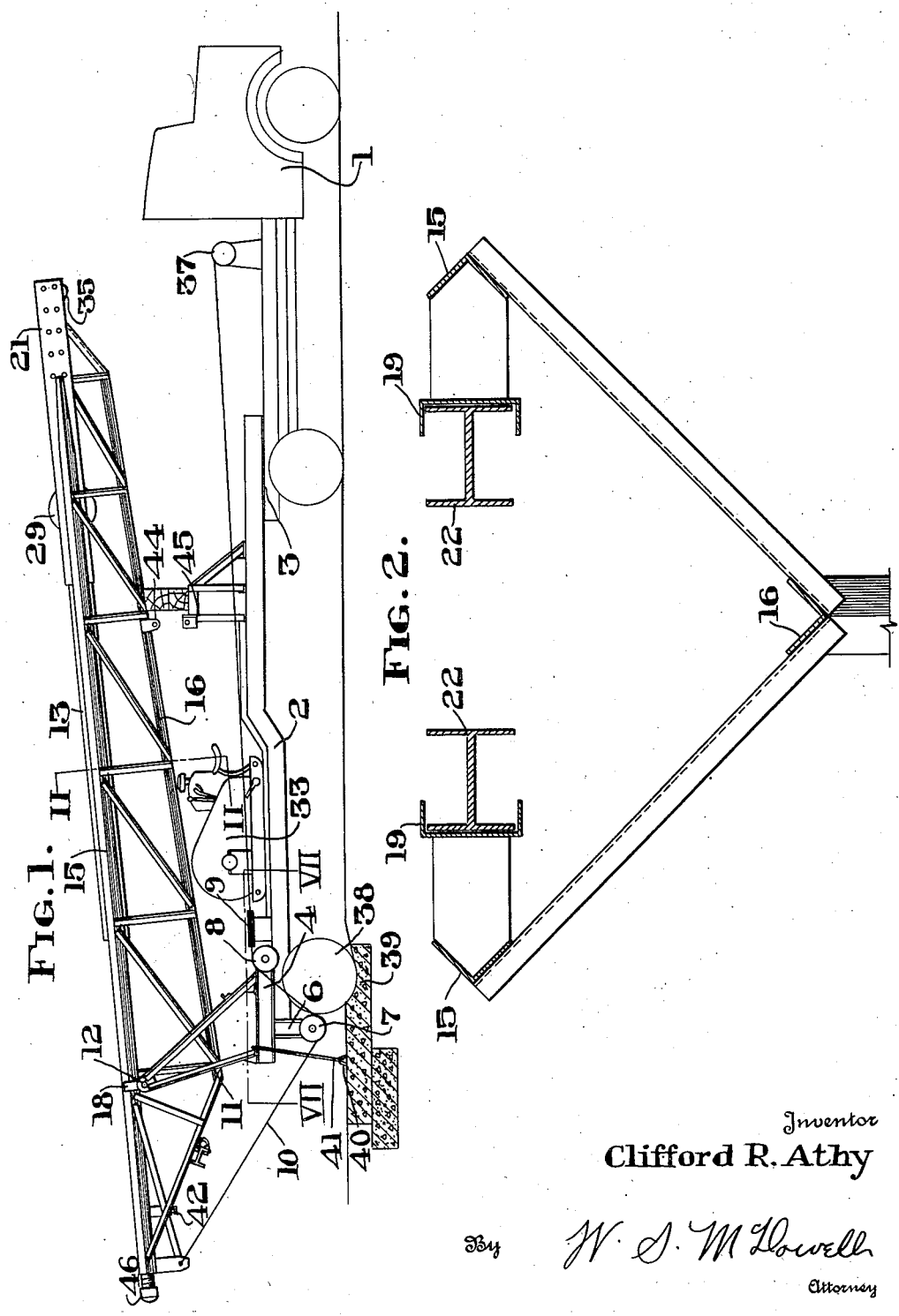

Inventor
Clifford R. Athy
By W. S. M. Howell
Attorney

Nov. 3, 1942.　　　　C. R. ATHY　　　　2,300,763
PORTABLE WELL DERRICK
Filed Oct. 28, 1941　　　　3 Sheets-Sheet 3
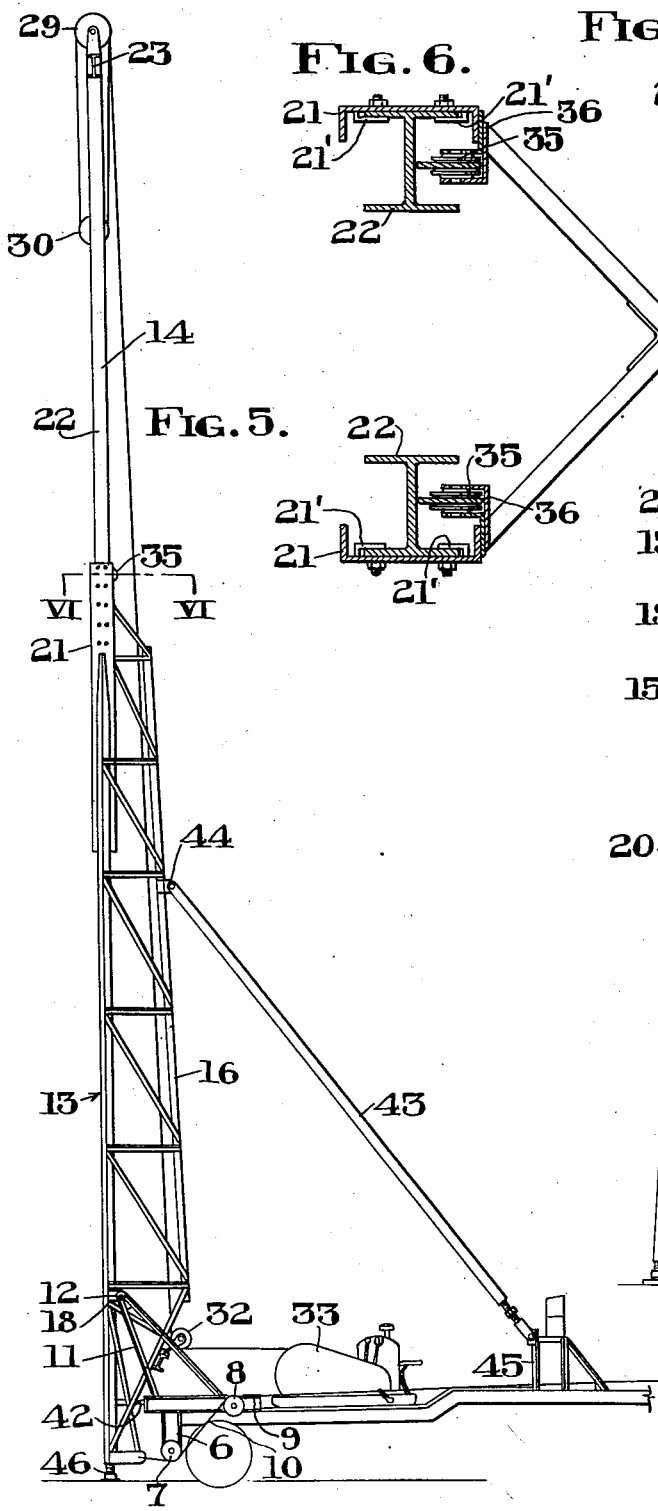
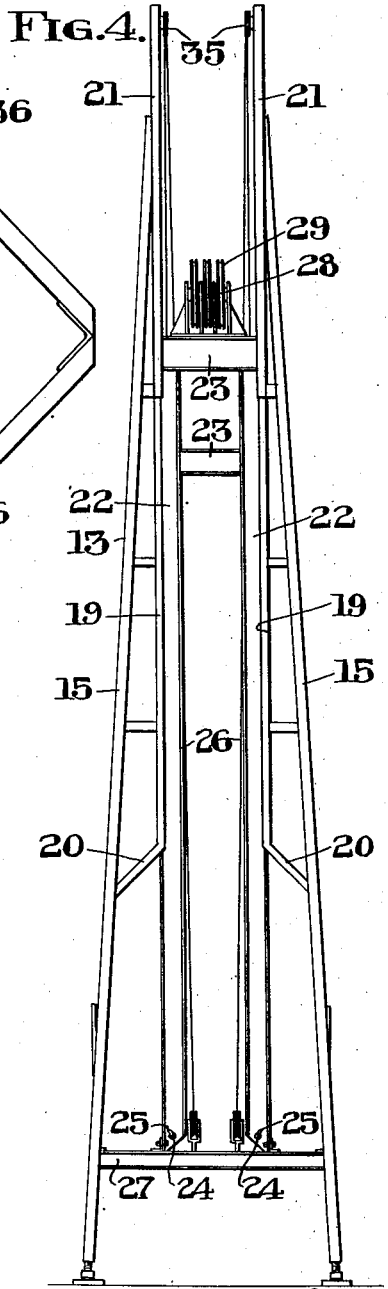
Inventor
Clifford R. Athy
W. S. M. Howell
Attorney Patented Nov. 3, 1942

2,300,763

UNITED STATES PATENT OFFICE 2,300,763

PORTABLE WELL DERRICK

Clifford R. Athy, Columbus, Ohio, assignor to International-Stacey Corporation, Columbus, Ohio, a corporation of Ohio Application October 28, 1941, Serial No. 416,907

4 Claims. (Cl. 189—15)

This invention relates to portable derricks, having particular reference to derricks of the type employed in the servicing of oil wells, for example, in operations involving the raising or lowering of rods and tubing, cleaning or swabbing, and other kindred operations.

It is an object of the invention to provide an extensible derrick adapted to be mounted on a ready portable base, such as a motor propelled vehicle or a trailer drawn by such a vehicle, and wherein the derrick includes telescopic sections capable of being collapsed and disposed in a substantially horizontal or prone position on its portable base when being moved from one location to another and, when in active use, raised to a substantially vertical position with the sections of the derrick suitably extended to obtain a derrick of required height.

Previous derricks of this general type have been objectionable in several respects, such as their excessive weight, the mechanical difficulties encountered in raising and lowering the derricks between active and inactive positions; their instability during use, necessitating the employment of guy cables or other comparable extraneous supports or braces and, generally, in heavy, cumbersome designs which rendered the derricks difficult to manipulate and slow in operation.

One of the primary objects of this invention resides in the provision of a portable derrick which will avoid or minimize, among others, the objections above noted, providing a portable derrick characterized by its lightness in weight, its ready transportability, one which may be readily raised and extended for operation and lowered or collapsed for movement from place to place and, further, a derrick which is rigid and stable when placed for operation and of high mechanical strength.

Another object rests in providing a portable derrick of this category with a pair of braced, telescopic, structural steel sections, the lower of said sections including side legs and the other of said sections having parallel legs disposed for movement in guides carried by the first section, novel pulley and cable means being provided to swing the derrick between prone transporting and upright operating positions, as well as to move the sections relatively in a telescoping manner.

A further object resides in the provision of a lightweight derrick mounted on a mobile support for swinging movement between horizontal and upright positions, and having combined therewith adjustable bumper and brace means disposed between the support and the derrick, whereby to maintain the derrick in its upright position and with the longitudinal axis thereof disposed in slightly angular relationship to the true vertical, whereby to enable the derrick to most effectively absorb the loads and strains imparted thereto when in active operation and obtain desired registration between the crown block and work line of the derrick with respect to the well bore.

Further and more detailed objects will be apparent from the following description and from a consideration of the accompanying drawings, in which a derrick embodying the features of the present invention has been illustrated.

In the drawings:

Fig. 1 is a side elevational view of a derrick formed in accordance with the present invention, showing the same in a collapsed or prone position and adapted for transportation from one location to another;

Fig. 2 is a detail vertical sectional view taken through the derrick on the plane indicated by the line II—II of Fig. 1;

Fig. 3 is a side elevational view illustrating the derrick in a partially raised position;

Fig. 4 is a front elevational view of the derrick in an upright position prior to the elevation of its upper section;

Fig. 5 is a side elevational view of the derrick with the upper section fully extended and set in its extended or active position;

Fig. 6 is a detail horizontal sectional view taken on the plane indicated by the line VI—VI of Fig. 5;

Fig. 7 is a detail horizontal sectional view taken on the plane indicated by the line VII—VII of Fig. 1.

Referring more particularly to the drawings, the numeral 1 designates a motor propelled vehicle or truck for moving the derrick from one well location to another, and at 2, there has been disclosed a trailer, or other portable support of the type usually referred to as a semi-trailer. The forward portion of this trailer vehicle is ordinarily pivotally connected to the chassis of the truck 1, as at 3, for turning movement about a vertical axis. The rear portion of the frame of the trailer vehicle is, in this instance, provided with a stationary base 4 composed of suitable structural members and adapted to support the derrick proper. The bed of the trailer is provided, as disclosed in Fig. 7, with planks 5, or the like, to form a working platform.

Depending from the opposite sides of the base 4 are downwardly directed extensions 6. The lower portions of these extensions are equipped with pulleys 7 which are adapted for rotation about a horizontal axis. A second set of pulleys 8 is journaled for rotation about a corresponding axis disposed in a plane above that of the first set of pulleys, the pulleys 8 being arranged at the sides of the base 4, as illustrated in Figs. 1 and 7. The trailer vehicle frame or base is further provided with a third set of pulleys 9 rotatable about fixed vertical axes, the circumferential portions of the pulleys 9 being disposed in tangential relationship to the corresponding portions of the pulleys 8. This arrangement of pulleys is desirable since the same receive a cable 10 employed in moving the derrick between prone and elevated positions, enabling the forces imparted to the cable to readily swing the derrick about its fulcruming pivot, as will be presently explained.

Rigidly mounted on the base 4 and disposed at the opposite sides thereof are A-frames 11. These frames lean toward the rear of the trailer and are provided at their upper ends with fulcrums 12 for the pivotal support of the derrick. The derrick proper includes a lower section 13 and an upper section 14. The section 13 is formed to include a pair of side legs 15 which converge upwardly, the legs being joined and braced by means of an outrigger construction 16 which causes the lower section of the derrick, as indicated in Fig. 2, to be substantially triangular in cross section, having an open back side. Plate members 18 are connected to the legs 15 and provide bearings for the reception of the pivots 12 in order to effect the support of the derrick on the frames 11.

As shown in Figs. 2 and 4, the lower section of the derrick is provided with a pair of spaced channel members 19, which are rigidly connected with and joined to the legs 15. The members 19 are disposed in parallel order with respect to each other and in opposed relation, that is, the open sides of the channels being directed toward one another for the purpose of forming guides for the telescopic reception of the upper section of the derrick. Any suitable bracing may be employed to connect the channels 19 with the legs 15 to produce a strong, lightweight, rigid structure.

As illustrated in Fig. 4, the channels 19 terminate in spaced relation from the lower ends of the legs 15, the lower ends of said channels diverging as at 20 for direct connection with the side legs of the derrick section 13. The channels 19 are supplemented at their upper ends with a continuing and second pair of channel members 21 of greater size, the members 21 serving to increase the strength of the derrick in regions where strains are apt to be incurred when the derrick is in operation, and also to provide space for the guide clips shown at 21' in Fig. 6. The channel members 19 and 21 constitute guide means or rails for the reception and telescopic movement of the upper section 14 of the derrick.

The upper section is formed to comprise a pair of H-beams 22 arranged in spaced parallel relationship and connected at their upper ends by I-beam cross members 23. The H-beams 22 each have one side flange positioned in the guide channel members of the lower section 13 for longitudinal movement. The lower ends of the beams 22 (Fig. 4) may be formed with openings 24 to receive hooks 25 with which are connected cables 26 employed in moving the upper derrick section longitudinally in the guide channels of the lower section 13. When the upper section is fully telescoped into the lower section, it may be retained in such position by suitably securing the lower ends of the H-beams 22 to a removable cross brace 27, the latter being positioned between the lower portions of the side legs 15. The brace 27 occupies this position when the derrick is being raised or lowered and transported. After the upper derrick section has been elevated to its active working position, the brace 27 is removed to provide clearance for the hoisting or work cable suspended from the upper portion of the derrick.

The upper ends of the H-beams 22 carry a crown block 28 having a suitable number of sheaves 29. The hoisting or work cable is received through these sheaves and also through the sheaves of a traveling pulley block 30. One end of the work line extends from the crown block around a pulley 32 carried by the braces at the lower end of the derrick section 13, said work or hoist line then extending to a winch 33 mounted on the bed of the trailer vehicle. By this means, the work line and the appliances connectible therewith may be suitably raised and lowered in a controlled manner. When the cable 31 is wound on the winch drum, the traveling block 30 will be raised in a customary manner, or if it is desired to lower the block, the line 31 is played out.

As illustrated in Figs. 1, 4 and 6, the upper ends of the channel members 21 are provided with pulleys 35. These pulleys are mounted upon brackets 36 which extend from the channel members inwardly and laterally of the derrick. The pulleys 35 are disposed in registration with the spaces formed between the flanges of the H-beams 22, in order that when these beams are elevated, the pulleys 35 will be cleared. The cables 26 extend upwardly from their connection 25 with the lower ends of the H-beams, being trained over the pulleys 35, and then passing downwardly for travel over suitable guide pulleys to a drum 37, driven by motive power obtained from the engine of the trailer 1.

The operation of moving the derrick from its transporting position as indicated in Fig. 1 to its operative position as shown in Fig. 5 is as follows: The truck is maneuvered to such a position that the rear wheels 38 of the semi-trailer rest in depressions provided in the concrete foundation 39 which has been previously laid in the ground adjacent to the well bore. This foundation has a plurality of inverted U-shaped anchor members 40 embedded in the concrete with the looped portions projecting above the upper surface. After the trailer has been properly positioned, it is positively secured by suitable cable or other devices 41 which extend around the anchor members 40 and the base 4. This arrangement prevents movement of the trailer when power is applied to the cables to elevate the derrick. The cable 10 is wound on the drum of the winch 36 and since this cable passes around the pulleys 7, 8 and 9 and is secured to the end of the mast, the shortening of the cable will cause the mast to pivot about the axis of the pins 12. When the mast has reached an upright position, adjustable bumper members 42 carried by the lower section will engage the rear portion of the base 4.

A brace member 43 is connected at one end with an ear 44 carried by the angle 16 adjacent to its upper end, the opposite end of the brace being connected with a bracket 45 carried by the forward portion of the trailer chassis. The mast is held in a substantially vertical position until the cables 26 are wound on the drum to move the upper section to a fully extended position. The section is maintained in this latter position or any intermediate position by a plurality of bolts extending through openings formed in the channels 21 and the outer flanges of the H-beams. After the upper section has been secured, the bumpers 42 and the brace 43 are adjusted to swing the derrick slightly beyond its truly vertical position at which time the center of rotation of the pulleys in the crown block will be directly over the well bore. Adjustable feet 46 may be lowered to engage the foundation and the derrick will then be in condition for operation.

When the derrick has served its purpose, the sections may be telescoped and lowered by reversing the above procedure.

From the foregoing, it will be apparent that through the provision of the lower derrick section and the channel-shaped guides, a stable, strong but lightweight structure is provided. Since the derrick is of such lightweight construction, expensive, cumbersome means to effect the elevation of the parts are not required, simple cable and pulley means only being employed and guy wires and other extraneous supporting means are eliminated to keep the derrick upright.

While a single embodiment of the invention has been illustrated, it is obvious that the shapes and relation of the parts may be changed without departing from the spirit and scope of the invention as set forth in the following claims.

What is claimed is:

1. A portable derrick comprising a mobile base, stationary frame members arising from said base, said derrick having telescopic sections pivotally carried by the upper end of said frame for movement between prone and upright positions, one section of said derrick having corner legs and brace means joined to form a rigid frame structure with one open side, guide channels carried by the open side of said structure in parallel longitudinally extending relation, a pair of H-beams connected to form the second section of said mast and disposed for sliding movement in said guide channels, and a crown block carried by the upper ends of said H-beams.

2. In a portable derrick of the type having a mobile base, said derrick being pivotally carried by said base for movement between prone and upright positions, means for moving said derrick comprising two sets of pulleys carried at opposite sides of said base for rotation about vertically and longitudinally spaced horizontal axes, a third set of pulleys journaled for rotation about transversely spaced vertical axes, and a flexible line trained around said pulleys and connected at its ends with the base end of said derrick, the application of power to the intermediate portion of said cable between the pulleys of said third set serving to impart rocking movement to said derrick about its pivotal mounting on the base.

3. In a portable derrick, a mobile base, a bottom derrick section having a pair of spaced angle members pivotally connected adjacent to one pair of ends to said base, the opposite ends of said angles being spaced a lesser degree than the pivoted ends, a pair of opposed parallel channel members positioned between said angles, brace means connecting said angles and channels to maintain the relative positions thereof, an upper derrick section having a pair of parallel H-beams, each thereof having one side flange slidably positioned in one of said channels, and means for moving said upper derrick section comprising a pulley journaled at the upper end of each channel member in registration with the space between the side flanges of the H-beam positioned therein, and cable means extending around said pulleys and connected at one end with the lower portion of said H-beams, the application of power to the other end of said cable means serving to move said upper section.

4. In well drilling and pumping apparatus, a mobile base, a derrick foundation, means formed with said foundation for locating and securing said base thereon, a derrick mounted on said base for pivotal movement about a horizontal axis disposed above and beyond one end of said base, means for moving said derrick to cause one end thereof to rest on said foundation adjacent to the end of said base, said means comprising a pair of pulleys, means projecting downwardly from said base to support said pulleys for rotation about a horizontal axis, a second pair of pulleys journaled on said base for rotation about a horizontal axis disposed above the first axis, a third pair of pulleys rotatable in a horizontal plane disposed substantially tangent to the pulleys of said second pair, a cable connected at its ends to said derrick beyond the pivot therefor, said cable being trained around said pulleys, and power driven means connected with the intermediate portion of said cable to apply a pulling force thereto whereby said derrick will be swung about its pivot.

CLIFFORD R. ATHY.